United States Patent
Schwab

(10) Patent No.: US 8,067,121 B2
(45) Date of Patent: Nov. 29, 2011

(54) FUEL CELL SYSTEM WHICH CAN BE USED IN A MOBILE MANNER WITH AN ADSORPTION ACCUMULATOR

(75) Inventor: Clemens Schwab, Wendlingen (DE)

(73) Assignee: Daimler AG, Stuttgart (DE)

( * ) Notice: Subject to any disclaimer, the term of this patent is extended or adjusted under 35 U.S.C. 154(b) by 1299 days.

(21) Appl. No.: 10/578,461

(22) PCT Filed: Oct. 26, 2004

(86) PCT No.: PCT/EP2004/012054
§ 371 (c)(1),
(2), (4) Date: May 8, 2006

(87) PCT Pub. No.: WO2005/048386
PCT Pub. Date: May 26, 2005

(65) Prior Publication Data
US 2007/0077473 A1    Apr. 5, 2007

(30) Foreign Application Priority Data
Nov. 6, 2003    (DE) .................................. 103 51 756

(51) Int. Cl.
*H01M 8/06* (2006.01)
*H01M 8/00* (2006.01)
*H01M 8/04* (2006.01)

(52) U.S. Cl. .......................... 429/408; 429/400; 429/428

(58) Field of Classification Search .................. 429/400, 429/408, 428
See application file for complete search history.

(56) References Cited

U.S. PATENT DOCUMENTS
6,195,999 B1 *   3/2001   Arnold et al. ................... 60/649

FOREIGN PATENT DOCUMENTS

| | | |
|---|---|---|
| DE | 43 10 836 | 10/1994 |
| DE | 101 28 877 | 12/2002 |
| EP | 0 989 290 | 3/2000 |
| EP | 1 291 949 | 3/2003 |
| JP | 10-144333 | 5/1998 |
| JP | 10144333 A * | 5/1998 |
| JP | EP 0989290 A2 * | 3/2000 |
| WO | WO 02/054520 | 7/2002 |

* cited by examiner

*Primary Examiner* — Karie O'Neill Apicella
(74) *Attorney, Agent, or Firm* — Davidson, Davidson & Kappel, LLC

(57) ABSTRACT

A fuel cell system which can be used in a mobile manner with a fuel cell unit (1) in order to produce electric energy, and an adsorption accumulator (3) which is associated with a fuel cell unit (1) are provided. The adsorption accumulator (3) is used to release heat and interacts in a thermal manner with a heat exchanger (2) which is arranged downstream from the fuel cell unit (1) in a cooling circuit (4, 5) associated with the fuel cell unit. A method for operating said type of fuel cell system, especially during a cold start is provided.

10 Claims, 2 Drawing Sheets

FUEL CELL SYSTEM WHICH CAN BE USED IN A MOBILE MANNER WITH AN ADSORPTION ACCUMULATOR

The invention relates to a fuel cell system for mobile use, having a fuel cell unit for generating electrical energy and an adsorption accumulator, assigned to the fuel cell unit, for releasing heat. The invention also relates to a method for operating a fuel cell system of this type.

BACKGROUND

The storage principle of sorption or adsorption accumulators is based on the property of some highly porous materials, such as for example silica gel, of attracting water vapor and bonding to the surface of the material, releasing heat. This accumulation of water is referred to as adsorption. Adsorption accumulators of this type are often used as drying agents in packaging materials. Conversely, when the material is heated, the bonded water is released again, or desorbed, in the form of water vapor, while at the same time the accumulator is laden with thermal energy. This process can be repeated as often as desired. Adsorption accumulators can store thermal energy in a high density.

Adsorption accumulators are used in stationary heating engineering, where they are employed in particular to improve the energy balance of solar thermal installations and district heating systems, in that they are responsible for balancing the thermal energy in the event of fluctuations over the course of time.

For mobile applications, in particular to assist with what is known as a cold start, it is customary to use heating systems which are based on thermally insulated hot water reservoirs (known as sensible heat storage), on accumulators which make use of the phase change of a material (known as latent heat storage) or on mobile incineration systems or electrical heating systems (stationary heating). Laid-open specification WO 02/054520 A1 relates, for example, to the use of a latent heat store in a mobile fuel cell system.

Adsorption accumulators have also found their way into mobile application areas. For example, laid-open specification DE 43 10 836 A1 has disclosed the provision of adsorption accumulators in motor vehicles driven by internal combustion engines; the thermal energy stored by the adsorption accumulator can be utilized to heat the vehicle interior or also an internal combustion engine which drives the vehicle prior to a start.

Patent application JP 10-144333 uses an adsorption accumulator to heat a fuel cell unit of a motor vehicle. The adsorption accumulator is assigned a condenser/evaporator, in which water is available for discharging the adsorption accumulator. When the fuel cell unit has reached an appropriate operating temperature, the adsorption accumulator, together with the condenser and two downstream heat exchangers, functions as cooling for the fuel cell unit, one of the heat exchangers releasing the heat of the fuel cell unit to the ambient air. The system described, in terms of the water balance, is a closed system in which there is no exchange of water with the environment. Water for discharging the adsorption accumulator is permanently available in the condenser. For this reason, with the system described, a start is only possible at temperatures above freezing point.

SUMMARY OF THE INVENTION

It is an object of the invention to provide a fuel cell system which is of simple construction, takes up little space and allows a rapid cold start in particular at temperatures below freezing point. A further object of the invention is to provide a method for operating a fuel cell system of this type.

The fuel cell system according to the invention comprises a fuel cell unit for generating electrical energy and an adsorption accumulator, assigned to this fuel cell unit, for releasing heat. The adsorption accumulator is in thermal terms operatively connected to a heat exchanger which is arranged in a cooling circuit assigned to the fuel cell unit, downstream of the fuel cell unit. In particular, fuel cell waste products, i.e. fuel cell exhaust gas or water in the form of water vapor, can be fed to the adsorption accumulator via a line.

According to the method of the invention, when the fuel cell system is starting up, the coolant in the cooling circuit is heated via the heat exchanger by means of the heat stored in the adsorption accumulator, with fuel cell exhaust gas products, i.e. water or water vapor, being fed to the adsorption accumulator at the same time as energy exchange medium. In the process, the adsorption accumulator is cooled. Once the cold start has ended and the fuel cell unit has reached a temperature at which no further heating is required—i.e. when the fuel cell unit is operating normally—heat is fed to the adsorption accumulator again via the heat exchanger in order to charge the adsorption accumulator, and in this way the stored water is released. The waste heat from the fuel cell unit during operation of the fuel cell system or a fuel cell vehicle is preferably used to charge the adsorption accumulator.

The use of an adsorption accumulator may provide a heat store with a high energy density and storage without heat losses which advantageously does not require any additional components, which would likewise represent energy consumers, as would be the case, for example, with an electrical heating system, a catalytic burner, stationary heating systems, etc. The fuel cell unit and any further components of the fuel cell system can be reliably and economically heated during a cold start, since the waste heat from the fuel cell system is used to charge the adsorption accumulator. The high performance of the coolant is in this way retained. The duration of heat storage is not subject to any time limitation and is independent of the ambient temperature.

On account of the increased energy density of the adsorption accumulator compared to other heat stores, which may amount to an increase of approximately 2.5 to 5 times, it is possible to save volume and weight for the heat store or the heat storage components. Further potential savings on volume and weight result from the loss-free thermochemical storage of heat inherent to the adsorption accumulator. The adsorption accumulator therefore can make do with less installation space. The storage materials or media which are used for the adsorption accumulator and preferably comprise metal hydrides, silica gels and/or zeolites, are neither corrosive, contaminating nor environmentally harmful.

The fuel cell system according to the invention—in particular also with regard to the water balance—may be an open system which involves both energy and mass exchange with the environment. In particular, water may be exchanged with the environment in the form of water vapor. There is no need for water for discharging the adsorption accumulator to be made available in an additional reservoir. As a result, freezing of the fuel cell system at temperatures below freezing point advantageously may be prevented, and the system can be started even at temperatures below freezing point.

Of course, the solution according to the invention can be used to assist cold starts even for conventional forms of internal combustion engine vehicle drives.

BRIEF DESCRIPTION OF THE DRAWINGS

Further advantageous configurations of the invention will be explained below with reference to the drawings, in which.

DETAILED DESCRIPTION

In the figures, identical reference designations are intended to denote functionally or structurally identical components. Directions of flow are indicated by arrows.

Figure 1:
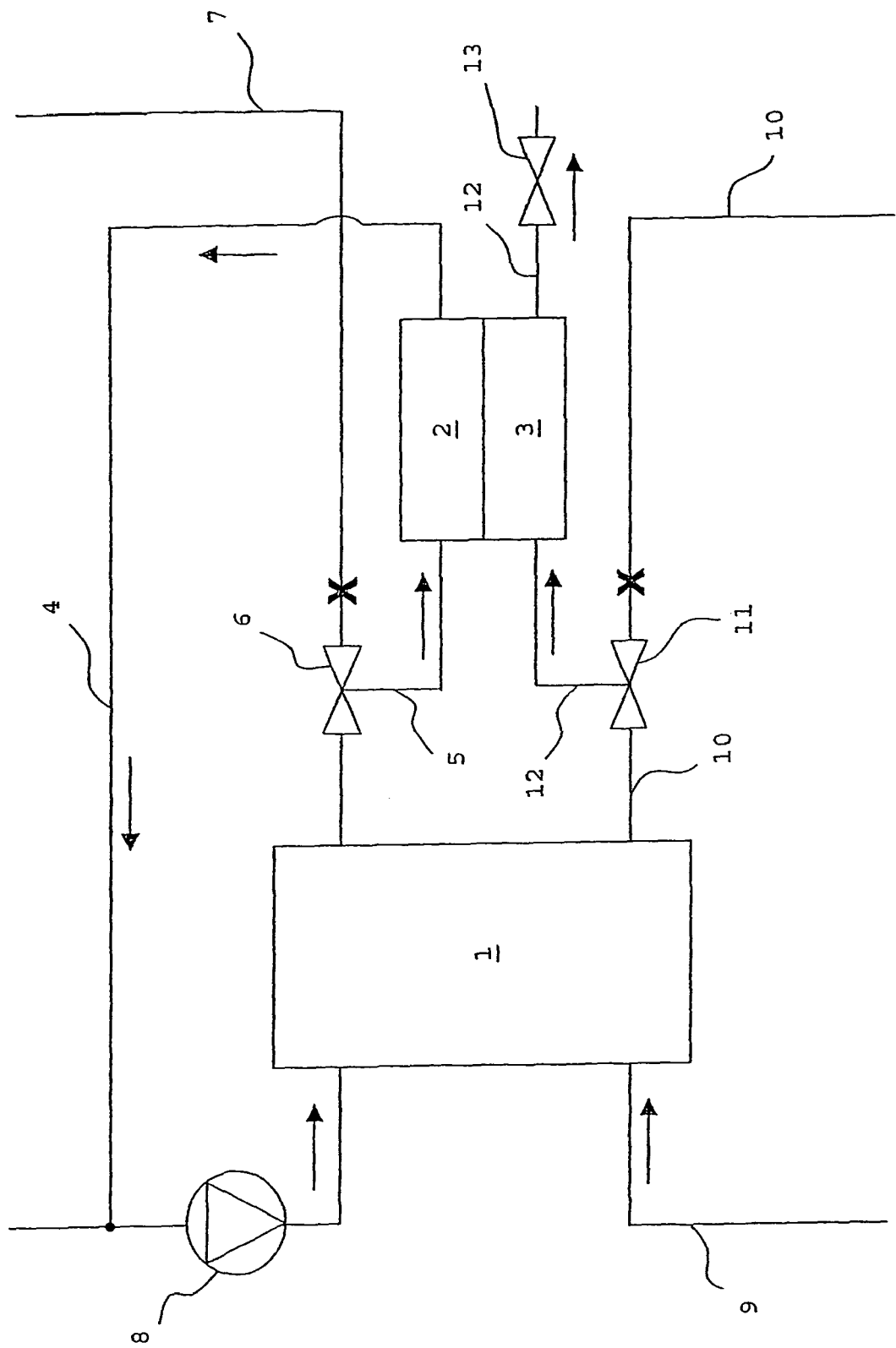
FIG. 1 diagrammatically depicts a fuel cell system according to the invention during the adsorption accumulator discharging or during starting, and FIG. 2 diagrammatically depicts the fuel cell system from FIG. 1 during the adsorption accumulator charging.

FIG. 1 diagrammatically depicts a fuel cell system according to the invention during a start, in particular a cold start. The fuel cell system comprises a fuel cell unit or a fuel cell module 1. The fuel cell unit comprises a plurality of fuel cells (not shown) which are connected to one another in the form of a stack. The fuel cells used are preferably polymer electrolyte membrane (PEM) fuel cells. The fuel cell unit 1 is supplied with hydrogen and oxygen in the form of air as reaction components. During the electrochemical reactions which take place in the fuel cell unit, electrical energy, heat and, as a waste product, in particular water in the form of water vapor are formed. The atmospheric oxygen is fed to the fuel cell unit 1 via a line 9. The fuel cell waste products are discharged via a line 10. A feed line for the hydrogen is not illustrated, for the sake of clarity.

The fuel cell unit 1 is arranged in a first cooling circuit 4, 5 assigned to the fuel cell unit 1; a coolant pump 8 for delivering coolant is preferably provided upstream of the fuel cell unit 1. Moreover, a heat exchanger 2 is provided in the first cooling circuit 4, 5, downstream of the fuel cell unit 1 and preferably upstream of the coolant pump 8.

The first cooling circuit 4, 5 is preferably coupled to a second cooling circuit 7, which is referred to below as the main cooling circuit 7 and is used, for example, to cool or heat a vehicle interior compartment. In the first cooling circuit 4, 5, an actuator 6, preferably a three-way valve, is arranged between fuel cell unit 1 and heat exchanger 2, by means of which actuator the flow of coolant can be passed on the one hand via the heat exchanger 2 and onward in the second cooling circuit 4, 5 or directly into the main cooling circuit 7.

The heat exchanger 2 is thermally connected to a heat store 3 which is designed as an adsorption accumulator. The heat exchanger 2 is preferably connected, by means of its longest side, to the longest side of the adsorption accumulator 3. An actuator 11, preferably a three-way valve, is provided in the line 10 which carries the fuel cell waste products away from the fuel cell unit 1, by means of which actuator the waste products can be passed through the adsorption accumulator 3 via the line 12, which may be designed as a bypass.

During a start or cold start of the fuel cell system, the coolant flows through the heat exchanger 2 in the first cooling circuit 4, 5. It is preferable for no coolant to be passed into the main cooling circuit 7, which is intended to be indicated in FIG. 1 by a corresponding cross in the line 7. There is preferably therefore no temperature control by the main cooling circuit 7. At the same time, fuel cell waste products and therefore water vapor are fed to the adsorption accumulator 3 via the lines 10 and 12. The waste products are therefore passed from the line 10 into the line 12 as a result of a corresponding position of the actuator 11, which is intended to be indicated in FIG. 1 by a cross in the line 10 downstream of the actuator 11.

Water vapor is fed to the adsorption accumulator with the waste products or waste air from the fuel cell unit 1. This water vapor is bonded by the adsorption accumulator 3, releasing thermal energy, the thermal energy being fed via the heat exchanger 2 to the coolant in the first cooling circuit 4, 5 and therefore to the fuel cell unit 1. This facilitates a cold start. Excess fuel cell waste products or waste air are preferably released to ambient air downstream of the adsorption accumulator 3 via the line 12 and an actuator 13, preferably an opened valve.

As an alternative or in addition to the supply of fuel cell waste products to the heat exchanger 3, it is of course also possible to provide an evaporator which generates water vapor and makes it available to the heat exchanger 3.

Figure 2:
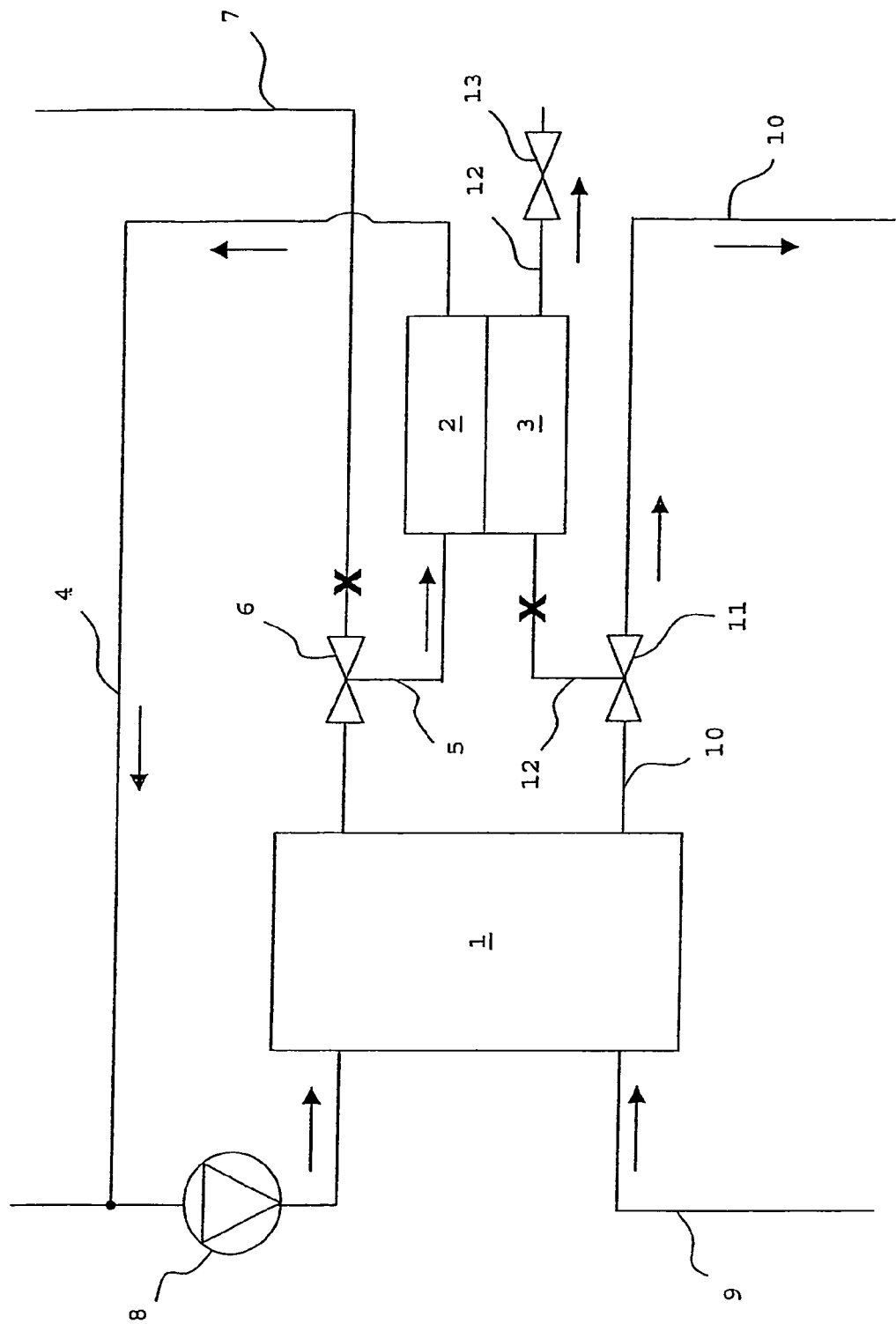

FIG. 2 diagrammatically depicts the fuel cell system from FIG. 1 during the adsorption accumulator charging. Once the fuel cell system has been successfully started and no further thermal energy is required by the adsorption accumulator 3 to heat the coolant of the first cooling circuit 4, 5, it may be necessary for the adsorption accumulator 3 to be loaded with thermal energy again. For this purpose, the coolant, which has now been heated by the operating fuel cell unit 1, is passed through the heat exchanger 2 via the actuator 6 and the line 5. It is preferable for no coolant to be passed into the main circuit 7, which is intended to be indicated by a corresponding cross in the line 7. On account of the thermal connection of heat exchanger 2 and adsorption accumulator 3, this leads to heating of the material of the adsorption accumulator 3 and therefore to charging of the adsorption accumulator with thermal energy and to release of the water vapor bonded by the material. The water vapor which is released is preferably discharged to ambient air downstream of the adsorption accumulator 3, via the line 12 and the actuator 13.

During the charging of the adsorption accumulator 3 with heat, it is preferable for no fuel cell waste products to be supplied via the line 12. This is indicated in FIG. 2 by a cross in line 12.

After successful charging of the adsorption accumulator 3, it is preferable for the supply of fuel cell exhaust gas products to the adsorption accumulator 3 and the discharge of water vapor from the adsorption accumulator 3 to be suppressed by stopping the supply to the line 12 upstream of the adsorption accumulator 3 by means of a corresponding position of the actuator 11 and the discharging from the line 12 downstream of the adsorption accumulator 3 by means of a corresponding position of the actuator 13 when no thermal energy is required to release the water vapor bonded by the material of the adsorption accumulator 3 or when there is no need for any heat stored in the adsorption accumulator 3 to heat the fuel cell system 1 via the coolant of the first cooling circuit 4, 5. This has the advantage that it is impossible for any ambient moisture to be drawn in by the material of the adsorption accumulator 3. Freezing up at ambient temperatures below the freezing point is likewise ensured. The fuel cell exhaust gas products can now be discharged via the line 10. In this operating state, in which the role of the adsorption accumulator 3 is to store the bonded thermal energy, the coolant which has been heated by the operating fuel cell unit 1 is preferably passed into the main cooling circuit 7 by means of a suitable position of the actuator 6, the actuator 6 preferably being switched in such a manner that no coolant is fed to the heat exchanger 2 via the line 5. By way of example, a passenger interior compartment can be heated by means of the main circuit 7.

What is claimed is:

1. A fuel cell system for mobile use comprising:
a fuel cell unit for generating electrical energy and fuel cell waste products;
a cooling circuit assigned to the fuel cell unit and having a heat exchanger downstream of the fuel cell unit;
an adsorption accumulator assigned to the fuel cell unit and forming a heat store adapted to release heat when adsorbing the fuel cell waste products, the adsorption accumulator being operatively thermally connected to the heat exchanger;
a first line connected to the fuel cell unit discharging the fuel cell waste products from the fuel cell unit; and
a second line connecting the first line to the adsorption accumulator for feeding the fuel cell waste products to the adsorption accumulator.

2. The fuel cell unit as recited in claim 1 wherein the adsorption accumulator includes at least one of a zeolite, a silica gel and a metal hydride.

3. A method for operating a fuel cell system for mobile use, the fuel cell system including a fuel cell unit for generating electrical energy and fuel cell waste products, a cooling circuit assigned to the fuel cell unit and having a heat exchanger downstream of the fuel cell unit, an adsorption accumulator assigned to the fuel cell unit and forming a heat store adapted to release heat when adsorbing the fuel cell waste products, the adsorption accumulator being operatively thermally connected to the heat exchanger, a first line connected to the fuel cell unit for discharging the fuel cell waste products from the fuel cell unit, and a second line connecting the first line to the adsorption accumulator for feeding the fuel cell waste products to the adsorption accumulator, the method comprising:
when the fuel cell system is starting up, heating coolant in the cooling circuit via the heat exchanger using heat stored in the adsorption accumulator, with the fuel cell waste products being fed to the adsorption accumulator at the same time, the fuel cell waste products including waste gas, and
in normal operation, feeding heat to the adsorption accumulator via the heat exchanger, with the coolant in the cooling circuit heated by the fuel cell unit being fed to the heat exchanger.

4. The method as recited in claim 3 wherein the adsorption accumulator includes at least one of a zeolite, a silica gel and a metal hydride.

5. The fuel cell system as recited in claim 1 the fuel cell waste products include water vapor and the adsorption accumulator is adapted to produce thermal energy by bonding the water vapor.

6. The fuel cell system as recited in claim 5 wherein the heat exchanger is adapted to transfer the thermal energy produced by the adsorption accumulator from the adsorption accumulator to the cooling circuit.

7. The fuel cell system as recited in claim 6 wherein the cooling circuit is adapted to transfer the thermal energy produced by the adsorption accumulator to the fuel cell to facilitate a cold start of the fuel cell.

8. The fuel cell system as recited in claim 1 further comprising an actuator coupled between the fuel cell and the adsorption accumulator, the actuator being adapted to pass the fuel cell waste products from the first line to the second line during a cold start of the fuel cell system and to prevent the passage of the fuel cell waste products from the first line to the second line after the cold start.

9. The fuel cell system as recited in claim 8 further comprising a second actuator located between the fuel cell and the heat exchanger, the second actuator adapted to pass coolant heated by the fuel cell to the heat exchanger to charge the adsorption accumulator after the cold start.

10. The fuel cell system as recited in claim 8 wherein the actuator is a three-way valve.

* * * * *